United States Patent [19]

Demetrescu

[11] Patent Number: 4,648,045

[45] Date of Patent: Mar. 3, 1987

[54] HIGH SPEED MEMORY AND PROCESSOR SYSTEM FOR RASTER DISPLAY

[75] Inventor: Stefan Demetrescu, Irvine, Calif.

[73] Assignee: The Board of Trustees of the Leland Standford Jr. University, Palo Alto, Calif.

[21] Appl. No.: 613,605

[22] Filed: May 23, 1984

[51] Int. Cl.⁴ ........................ G06F 15/20; G06F 3/14; G09G 1/00

[52] U.S. Cl. .................................... 364/518; 364/521; 340/799

[58] Field of Search ................ 364/518, 521; 340/799, 340/723, 728, 747, 748, 721; 358/75

[56] References Cited

U.S. PATENT DOCUMENTS

| | | | |
|---|---|---|---|
| 4,092,728 | 5/1978 | Baltzer | 340/799 X |
| 4,197,590 | 4/1980 | Sukonick et al. | 340/799 X |
| 4,237,543 | 12/1980 | Nishio et al. | 340/799 X |
| 4,326,202 | 4/1982 | Kidode et al. | 340/799 |
| 4,418,343 | 11/1983 | Ryan et al. | 340/799 X |
| 4,521,805 | 6/1985 | Ayata et al. | 358/75 |
| 4,553,172 | 11/1985 | Yamada et al. | 358/75 X |
| 4,556,879 | 12/1985 | Tanaka | 340/799 X |
| 4,562,435 | 12/1985 | McDonough et al. | 340/799 X |

*Primary Examiner*—Edward J. Wise

*Attorney, Agent, or Firm*—Flehr, Hohbach, Test, Albritton & Herbert

[57] ABSTRACT

Disclosed is a high speed memory system having a parallel architecture which is particularly advantageous in controlling a multiline raster scanned display. Data for a plurality of scan lines is processed in parallel, and pixel data for each of a plurality of scan lines is stored in a plurality of memory segments which can be accessed in parallel. Latch means is provided with each memory segment for latching pixel data for scan line control in order to allow continued manipulation of data stored in the memory segment while scan line data is extracted. A plurality of scan line processors are connected to a common bus which provides transformed data of primitives in display coordinates. Each scan line processor controls data for a plurality of scan lines, and a plurality of memory segments are connected with each scan line processor for storing and manipulating pixel data for the plurality of scan lines. Each memory segment includes a random access storage array and an arithmetic logic unit responsive to scan line number, start point, and end point data from the scan line processor for storing and accessing data in the random access storage array. The arithmetic logic unit is responsive to halftone pattern data or smoothly interpolated intensity data and commands for performing Boolean logical operations on stored data.

38 Claims, 14 Drawing Figures

HIGH SPEED MEMORY AND PROCESSOR SYSTEM FOR RASTER DISPLAY

This invention relates generally to digital memories, and more particularly the invention relates to high speed memory systems useful in controlling a raster display and the like.

Briefly, a raster display is any output device which produces an image by selectively changing the color and or intensity of many small dots (or picture elements, pixels) which are arranged in a regular rectangular array. Such a display can include periodically refreshed devices such as the cathode ray tube display or hard copy printer devices such as xerographic raster laser printers.

Computer graphics have moved away from calligraphic displays such as randomly scanned vector CRTs and pen plotters and toward raster displays such as television displays and raster page printers. This conversion is due to many reasons, including: (1) raster displays cost significantly less than other display methods, (2) most raster displays rely on a frame buffer and the cost of semiconductor memory has recently declined sharply, (3) raster displays can fill areas with solid colors (and shading) whereas calligraphic displays can only efficiently draw outlines, and (4) raster displays can display characters in many font styles more naturally and efficiently than calligraphic displays.

A typical graphical display system is given high level descriptions of a two or three dimensional image in world coordinates which are the coordinates which most naturally describe the image. This image is transformed and clipped using well known graphical methods into a two dimensional representation in terms of graphical primitives described in the display screen coordinates. These transformation functions have been incorporated into a very large scale integrated circuit VLSI design as disclosed in U.S. Pat. No. 4,449,201 for Geometric Processing System Utilizing Multiple Processors. A rasterizer adds these transformed primitives to the partially completed rasterized image, (i.e. it modifies the intensity of some of the pixels in the image raster, or array) and also displays or prints the image raster.

Unfortunately, the move from calligraphic to raster displays has brought new problems. In a raster system, it is necessary not only to compute the positions of the primitives but also to fill all of the pixels in the interior of the primitives with the desired values. Currently, the speed with which polygons can be filled is typically much slower than the speed with which the position of the polygons can be calculated.

As a result, the use of raster displays for real time images has been limited and expensive. For example, if an image of 1000 by 1000 pixels is to be redrawn 30 times a second, one must typically access more than 30 million pixels per second. This is the rasterization problem.

In accordance with the present invention a high speed memory and processor system is provided which includes a plurality of memory segments. Each memory segment includes a random access memory array and a processor which controls the storing, accessing, and manipulating of data in the array. A plurality of memory segments cooperatively store pixel data for a plurality of raster scan lines and operate in response to a shared scan line processor. The scan line processor receives transformed and clipped data from a graphics transformation and clipping processor and converts each graphical object which it is given into a sequence of horizontal pixel segments which are presented to the plurality of memory segments as commands of the form: scan line (Y), start point ($X_s$), end point ($x_e$), pixel fill pattern, and ALU operations. Each memory segment processor responds to these horizontal segment commands by updating the memory segments in response thereto.

Accordingly, an object of the present invention is a high speed memory system.

Another object of the invention is a memory system including a plurality of memory segments each of which is controlled by a dedicated processor.

Yet another object of the invention is a highly parallel memory system which is readily implemented using VLSI techniques.

The invention and objects and features thereof will be more readily apparent from the following detailed description and the appended claims when taken with the drawing, in which:

Figure 1:
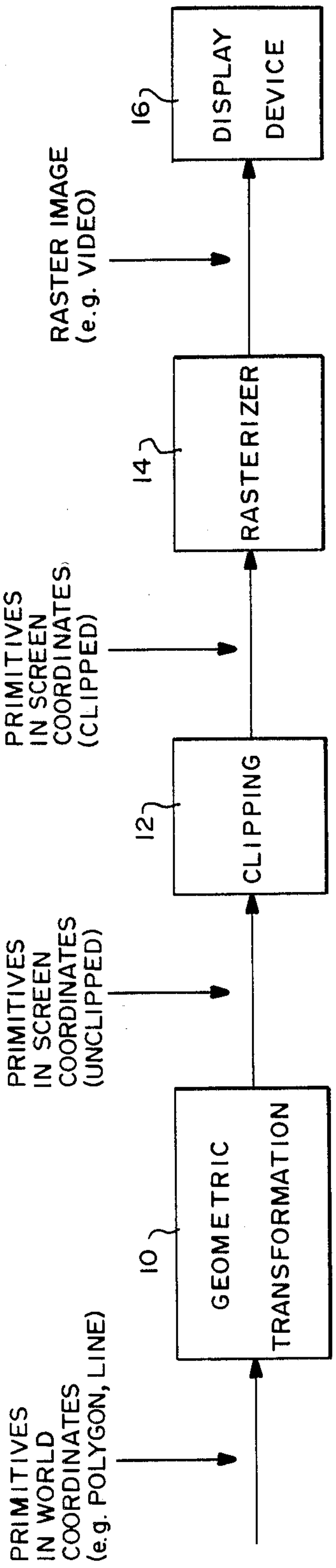
FIG. 1 is a functional block diagram of a graphics display system.

Referring now to the drawings, FIG. 1 is a functional block diagram of a graphics display system in which primitives in world coordinates (e.g. a polygon or line) are transformed at 10 into screen coordinates which are then clipped at 12 for controlling a display device. The functions of units 10 and 12 can be provided by a geometry engine as disclosed in U.S. Pat. No. 4,449,201, supra. The coordinates as transformed and clipped for use in the display are then applied to a rasterizer 14 which includes a bulk memory for storing the partially constructed image as an array of pixels and means for controlling the raster scan lines in the display device 16.

As above described, the display device may comprise an image of 1,000 by 1,000 pixels which must be redrawn 30 times a second on a cathode ray tube. Accordingly, data for 30 million pixels must be accessed each second.

Alternatively, the display may be a raster printer capable of printing an 8.5 by 11 inch piece of paper each second. If the resolution is 300 pixels per inch in X and Y directions, 8.4 million pixels must be accessed each second.

Figure 2:
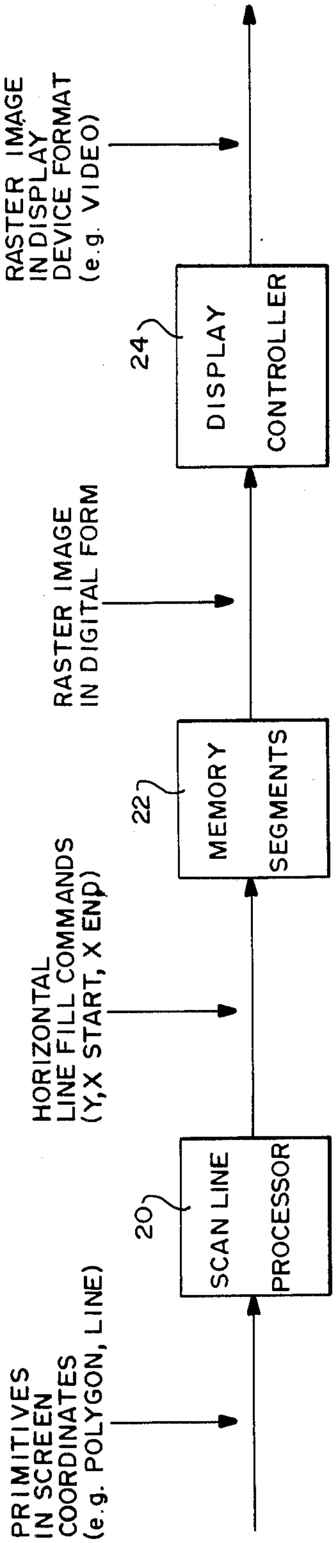
FIG. 2 is a functional block diagram of the rasterizer of FIG. 1 including a memory system in accordance with the present invention.

FIG. 2 is a functional block diagram of a rasterizer employing a high speed memory system in accordance with the invention. The rasterizer includes a scan line processor 20, a plurality of memory segments 22 which are controlled by the scan line processor 20, and a display controller 24. The scan line processor 20 receives primitives in screen coordinates from the geometric transformation processor 10, and the scan line processor 20 then provides horizontal line fill commands (Y, $X_s$, $X_e$) to the memory segments 22. Data from the memory segments is then provided in digital form for the raster image which is provided to the display controller 24 for control of the display device. The scan line processor converts each graphical primitive to horizontal pixel sequences to be filled, as will be discussed further hereinbelow with reference to FIG. 4 and to FIG. 5. The memory segments 22 are responsible for maintaining the raster image (i.e. the array of pixels) and for modifying it as horizontal line fill commands are received from the scan line processor. The exact function of the horizontal line fill commands will be discussed hereinbelow with reference to FIGS. 4 and 6. The display controller 24 extracts the rasterized image from the raster processors and controls the raster display or raster printer.

Figure 3:
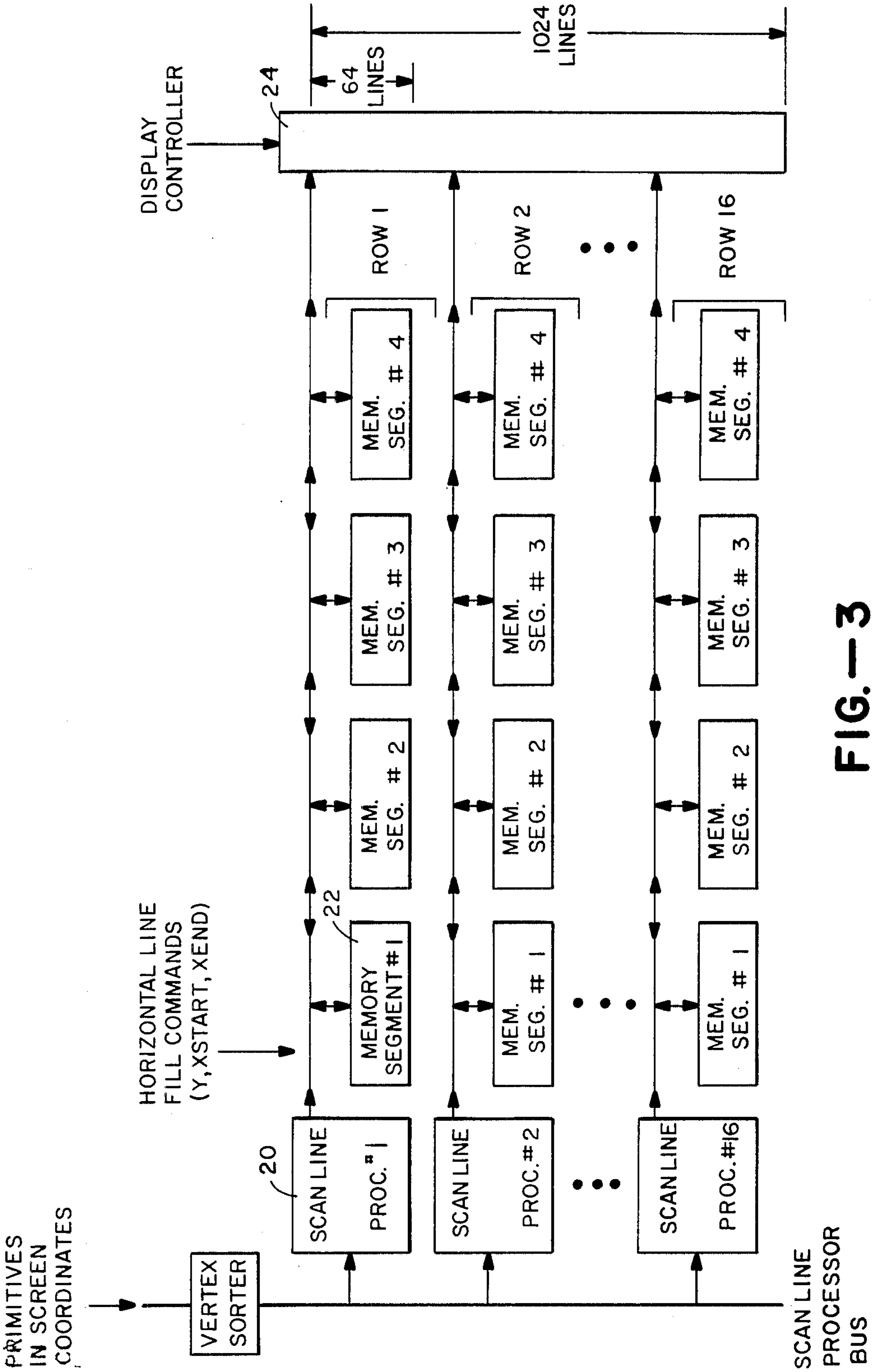
FIG. 3 is a functional block diagram of a memory system including a plurality of memory segments in accordance with the invention and as employed in the rasterizer of FIG. 2.

FIG. 3 is a functional block diagram memory system including a plurality of memory segments in accordance with the invention and as employed in the rasterizer of FIG. 2. In this embodiment 16 scan line processors 20 control an array of 64 memory segments 22 which control pixel data for a display having 1024 scan lines with 1024 pixels per scan line. In this embodiment each scan line processor controls four memory segments which cooperatively store and modify the data for 64 lines of 1024 pixels per line. Each memory segment may comprise a 16K memory arranged in 64 lines with 256 data bits per line. Each group of memory segments operates in response to one of the 16 scan line processors 20 which allows independent and parallel operations of the groups of memory segments. Further, each memory segment 22 includes its own processor whereby each memory segment can be manipulated in parallel with other memory segments controlled by the shared scan line processor 20.

Figure 4:
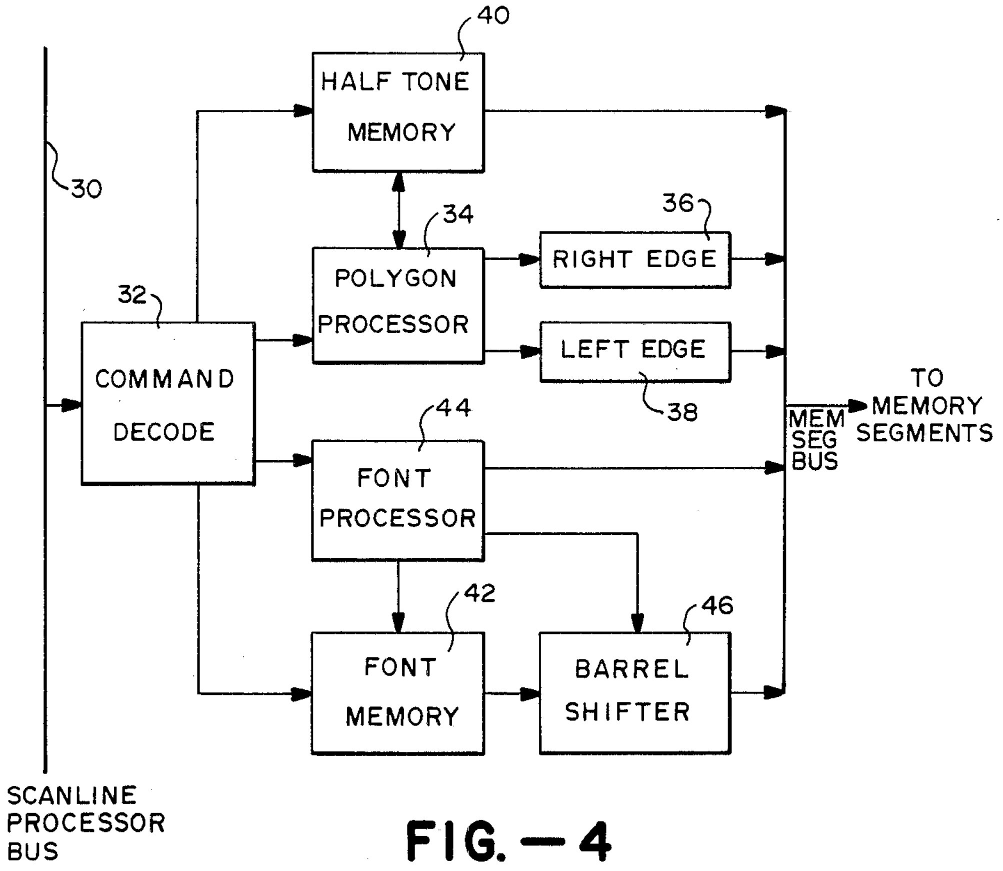
FIG. 4 is a functional block diagram of the scan line processor of FIG. 3.
Figure 5:
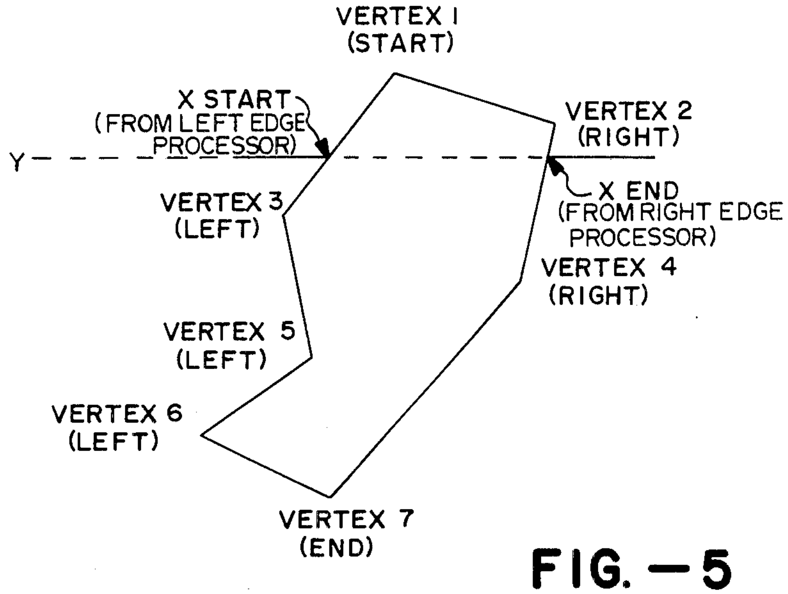
FIG. 5 is an illustration of a polygon to be displayed and which illustrates operation of the scan line processor.

FIG. 4 is a functional block diagram of a preferred scan line processor. For simplicity, the scan line processor will process only characters and monotone polygons in which a horizontal line intersects the boundary of the polygon at most twice. FIG. 5 is an illustration of such a polygon. The polygon vertices are presented to the processor in descending Y order, and each vertex is labeled as to whether it is part of the left edge or the right edge of the polygon.

Referring to FIG. 4, commands on the bus 30 are interpreted by the command decoder 32 which proceeds to dispatch the commands to the appropriate memory parallel function block. Each parallel function block is composed of a conventional stored program computer as is well known in the art.

The command decoder 32 can accommodate four general kinds of commands: (i) fill halftone memory 40 with a given pattern which will be used to fill the interior of subsequent polygons, (ii) fill font memory 42 which will be used to subsequently place characters in the raster image, (iii) rasterize polygon by enabling the polygon processor 34, (iv) rasterize character by enabling the font processor 44.

The polygon processor 34 is in charge of rasterizing the current polygon until the end of either the right or the left current edge. When this occurs, the polygon processor 34 awaits the next edge from the command decoder. When the next edge is received, the polygon rasterization continues using scan line algorithms well known in the art. The two edge processors 36 and 38 simultaneously calculate the beginning and ending X coordinates for the next scan line to be rasterized using methods well known in the art. FIG. 5 illustrates these operations.

Figure 6:
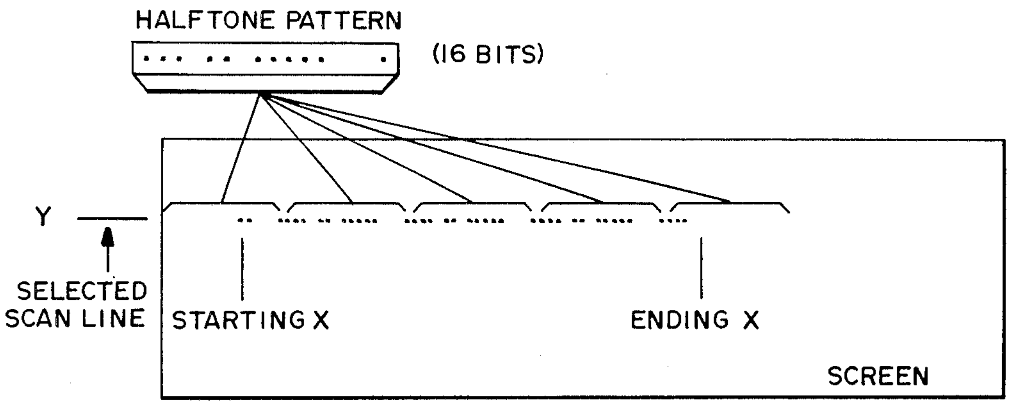
FIG. 6 illustrates the effect of each of the horizontal line fill commands sent by the scan line processors to the memory segments.

After both edge processors have calculated the intersection of the current scan line (Y) with the two edges of the polygon, this information is sent to the memory segments in the form of a horizontal line fill command consisting of: (i) the Y coordinate (i.e. scan line) which is to be modified, (ii) the first pixel which is to be affected (which has been calculated by the left edge processor 38), (iii) the last pixel which is to be affected (which has been calculated by the right edge processor), and (iv) the 16 bit halftone pattern which is to be used as a repeating pattern to fill the selected horizontal segment. The effect of this command is illustrated in FIG. 6.

The halftone pattern is selected by the polygon processor 34 from one of 16 patterns stored in the halftone memory 30. These patterns are stored there through the use of commands to the scan line processor 20 through the scan line processor bus 30. The polygon processor 34 selects one of these 16 patterns by using the function [(current Y coordinate) modulus 16]. This produces the effect of repeating the halftone pattern every 16 scan lines.

The font processor 44 is responsible for placing the current character in the raster. It reads the character pattern from the font memory and uses the barrel shifter 46 to align the character pattern properly for placement in the memory segments. Each character is placed in the image raster in many 16 bit horizontal sections by sending horizontal line fill commands as shown in FIG. 6 which modify only 16 pixels at a time and with a halftone pattern which represents one of the scan lines of the character which is to be rasterized. Thus, each character is rasterized by sending one horizontal line fill command for each scan line which the character occupies.

Note that all of the functions of the scan line processor can be performed by one conventional stored program computer (e.g. a Motorola 68000 microprocessor with associated memory) by being programmed with algorithms to perform the described operations which are well known in the art. The preferred embodiment described above merely speeds up the function of the scan line processor by having multiple conventional processors operating in parallel to achieve the same result.

Figure 7:
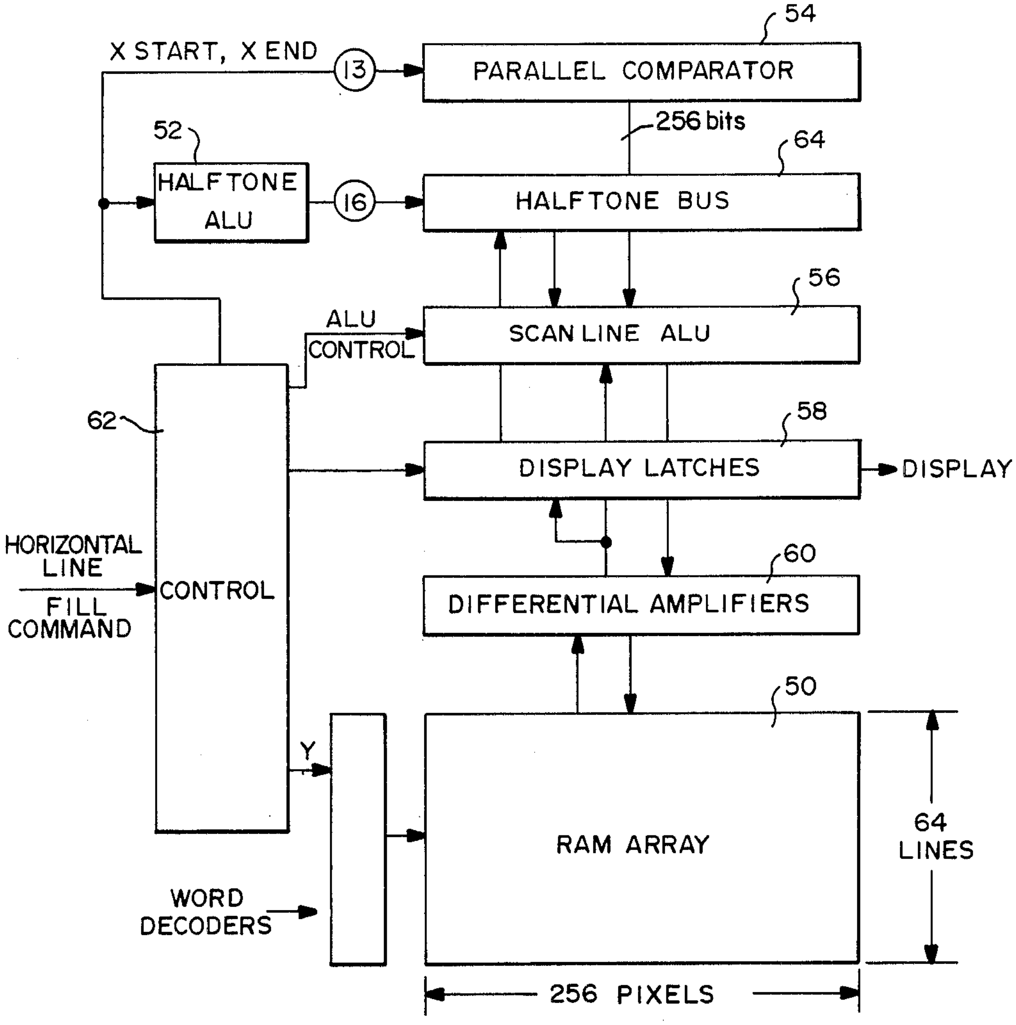
FIG. 7 is a functional block diagram of a memory segment in accordance with the invention.

FIG. 7 is a functional block diagram of a memory segment in accordance with one embodiment of the invention which is composed of 6 major sections.

The main memory 50 is a standard dynamic or static random access memory (RAM) design. It is desirable to have an array much wider than it is long in order to achieve the largest amount of parallelism possible. In this embodiment a 16K bit RAM is to be used which is organized as 64 words (i.e. rows) of 256 bits (i.e. columns) each.

The halftone arithmetic logic unit (ALU) 52 intercepts the incoming 16 bit halftone pattern and performs simple Boolean operations which allows for multiple value halftoning while imaging primitives. The incoming halftone pattern can be interpreted in one of four ways: (1) it is used as is, (2) it is inverted bitwise before it is used, (3) it is ignored and all 1s are used instead, (4) it is ignored and all 0s are used instead. This allows for multiple value halftoning while imaging primitives. If each pixel can have one of 8 levels of gray, it is possible to halftone by using a mixture of two of the 8 gray scale values. For example, to achieve an intensity of 5.5, a polygon can be filled with an alternating pattern of gray value 5 and 6. This effect can be achieved by issuing pixel fill commands to the memory segment processors while commanding that the most significant bit plane use a halftone pattern of all 1s, the middle plane use the halftone pattern as given, and the least significant plane use the pattern inverted. This places a 6 in all locations where the halftone pattern is 1 and 5 elsewhere.

The parallel comparator 54 provides 256 outputs and sets all output bits whose position is less than the given X coordinate. This selects the left and right limits of the pixels to be affected during the execution of a horizontal line fill command. These limits are used by the scan line ALU 56.

The scan line ALU 56 determines what value is to be stored back into each of the 256 columns of the memory array given the input values from the parallel comparator 54, the halftone ALU 52 (through the halftone bus), and the memory array 50.

The display latches 58 latch a scan line from differential amplifiers 60 so that the line can be removed from the memory segments independently of the functioning of the rest of the memory segment components.

The control logic 62 controls the memory array, the parallel comparator, the ALUs, and the display latches to cause them to execute the horizontal line fill commands for which this memory segment is responsible.

In order to distribute the repeating 16 bit halftone pattern 256 bits to the corresponding bits of the memory words, each of the 16 bits from the halftone ALU is delivered to every 16th column. This is achieved by running a 16 bit bus 64 horizontally above the memory array. If it is desired to place patterns which are aligned with respect to the starting X coordinate (e.g. for rasterizing characters), it is necessary to rotate the pattern by X mod 16. This rotation can be performed by the Scan Line Processor without any increase in bandwidth between the scan line processor and the memory segment.

Figure 8:
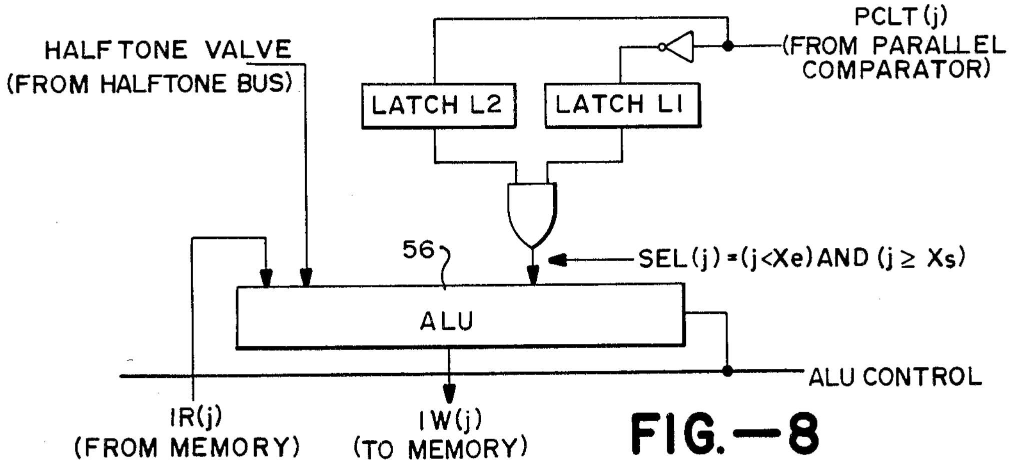
FIG. 8 is a functional block diagram of a scan line arithmetic logic unit (ALU) in the memory segments of FIG. 7.

FIG. 8 is a functional block diagram of one bit position (j) of the 256 bits of the scan line ALU 56, and following is a description of a typical cycle thereof while performing a horizontal line fill operation.

First, the (inclusive) starting coordinate (Xs) of the X extent (i.e. column extent), to be affected is presented to the parallel comparator and the inverse of its output is latched into L1. Thus, L1 is true for all locations (i.e. columns), along the scan line which are greater than or equal to Xs.

Second, the (exclusive) ending coordinate (Xe) of the X extent is presented to the parallel comparator and its output is latched into L2. Thus, L2 is true for all locations along the scan line which are less than Xe. Consequently, SEL(j) is true for all X in the range (Xs, Xe).

By this time, the RAM array has retrieved the current values of the pixels (IR(j)) in the currently selected scan line. The ALU operates on the selected bits as desired and generates the pixel IW(j) to be written back into memory.

In order to keep the ALU as simple as possible, only the following minimal set of operations needs to be implemented: (i) no operation, make IW(j)=IR(j), (ii) replace the halftone pixels at all selected pixel locations, (iii) OR the halftone pixels with all selected pixels. Other functions are possible, (e.g. all of the known Boolean operations) at the expense of making the ALU larger.

Figure 9:
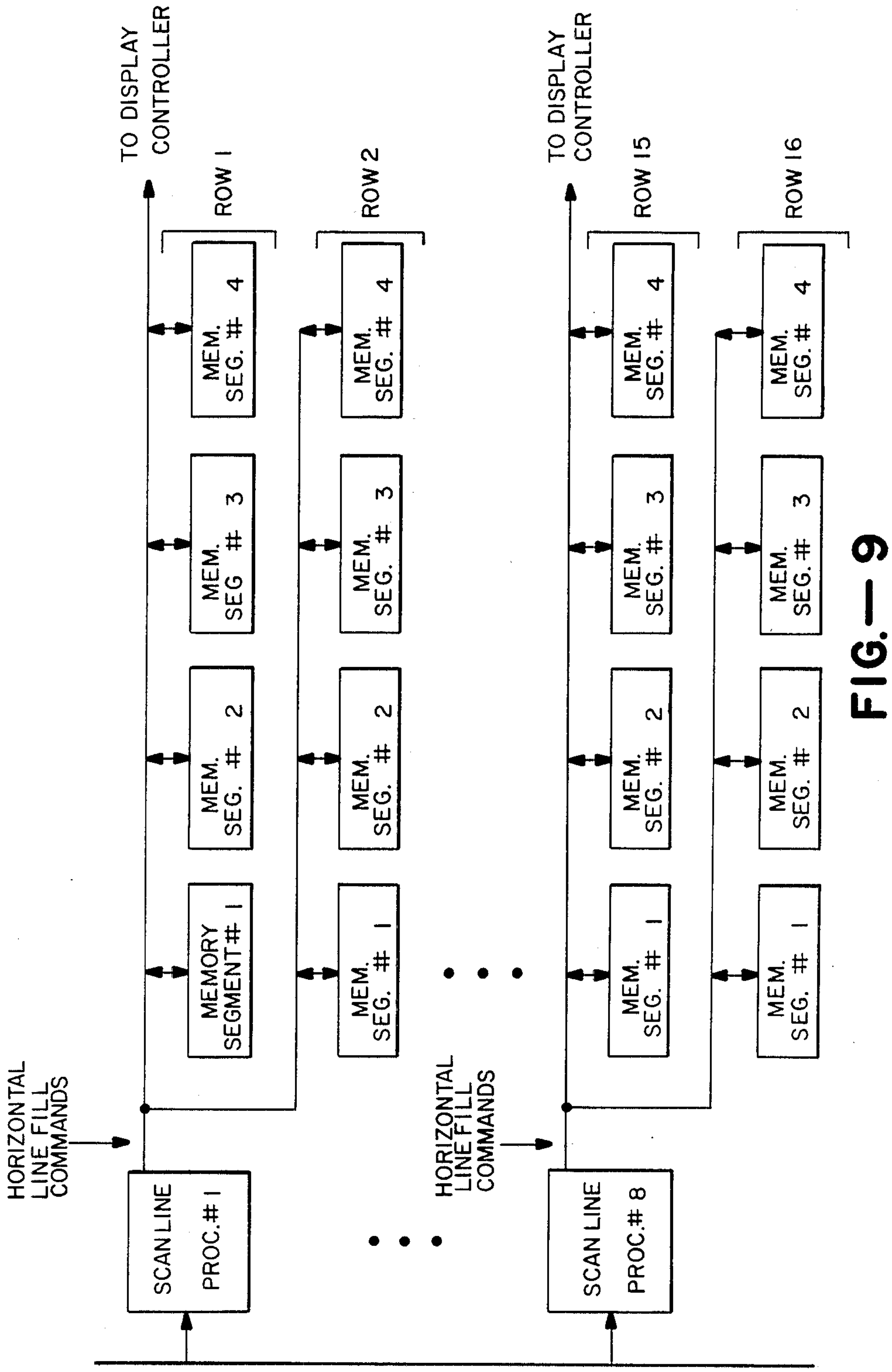
FIGS. 9–11 are functional block diagrams of alternative arrangements of memory systems in accordance with the invention.
Figure 10:
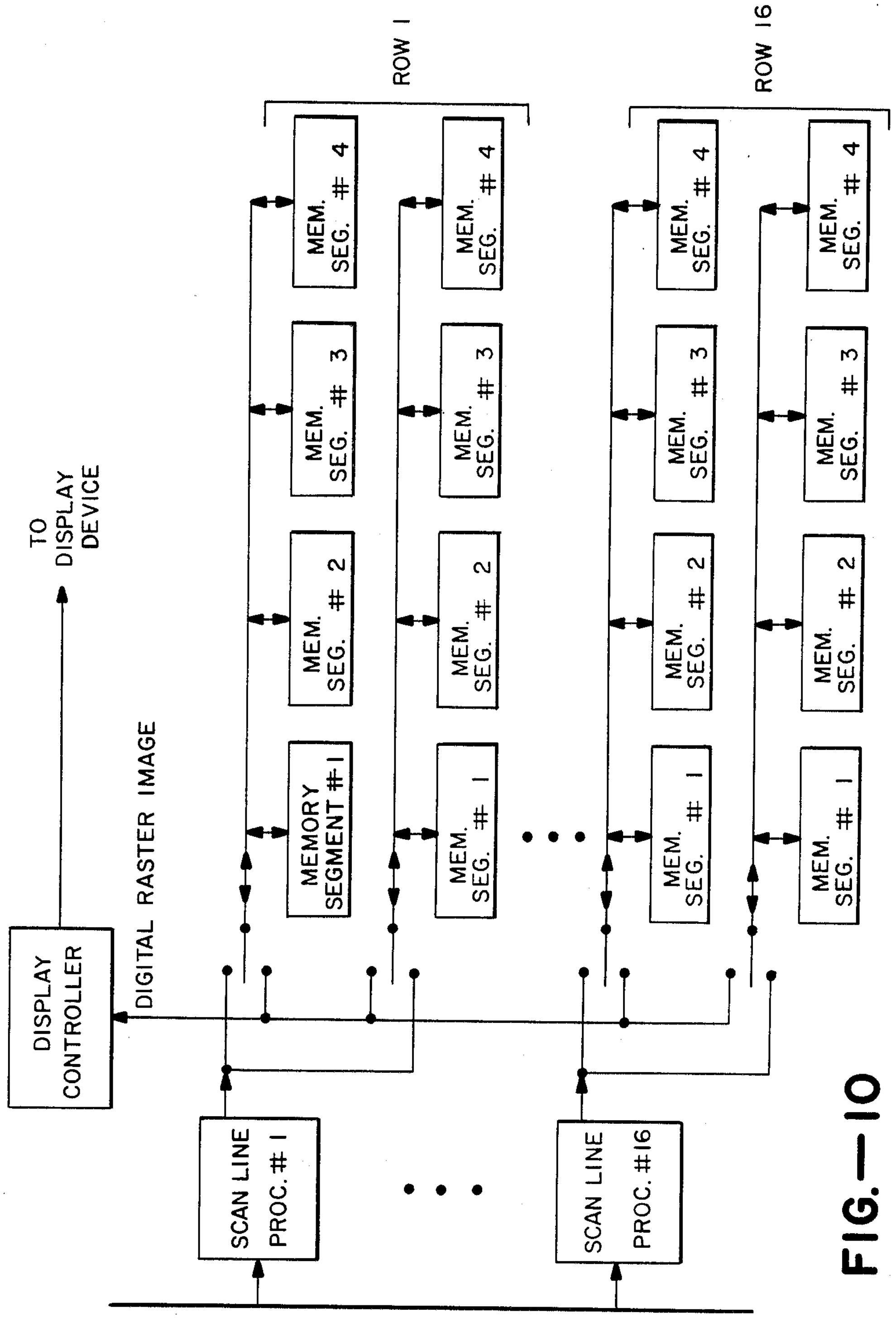
Figure 11:
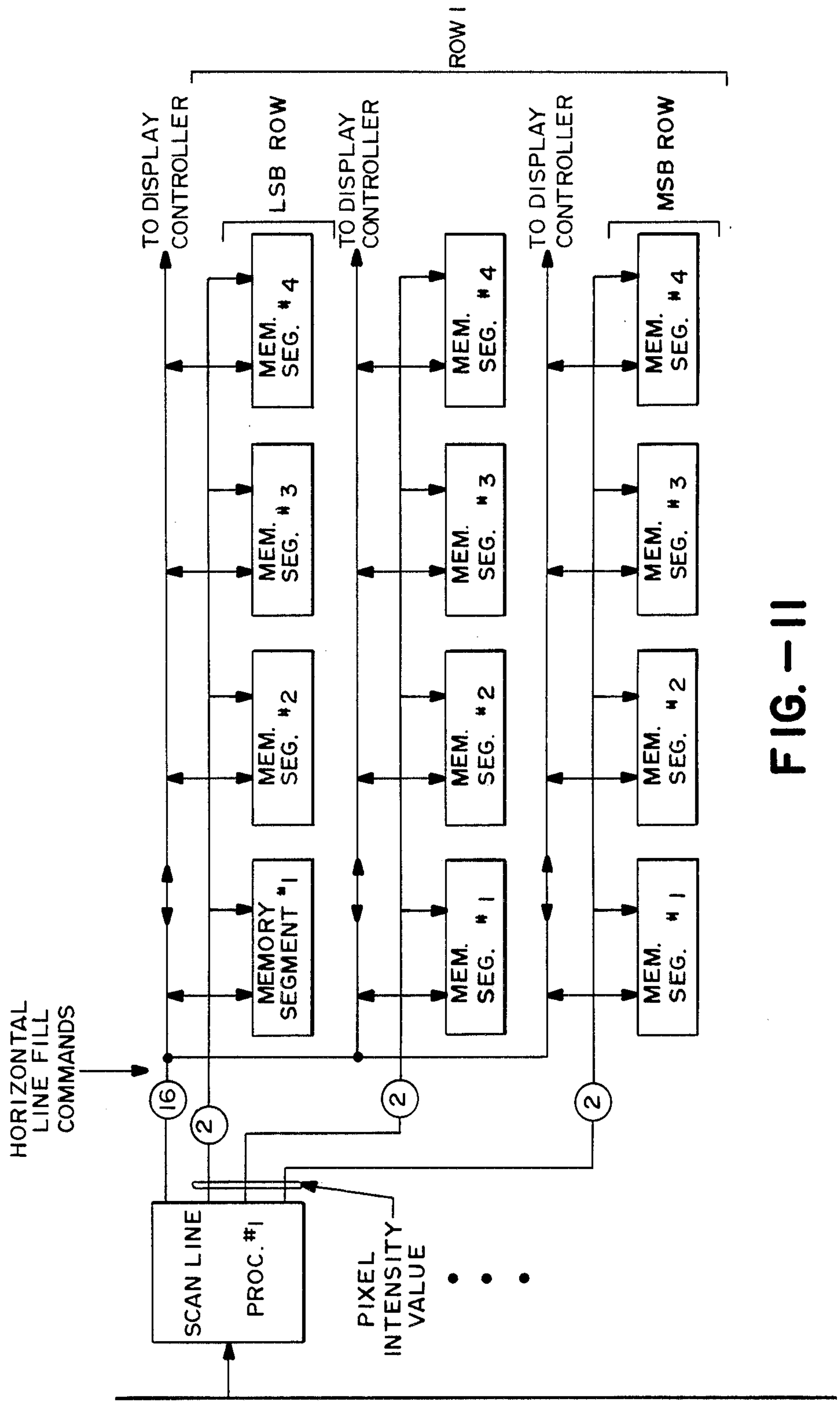

FIGS. 9–11 are functional block diagrams of alternative memory systems in accordance with the invention. In FIG. 9 each scan line processor controls two rows of memory segments thereby reducing the cost of the memory system but also reducing the parallel operation. In FIG. 10 a double buffered system is provided wherein one set of memory segments is displayed while another set is controlled by the scan line processors which are generating the next frame for display. This arrangement allows the scan line processors to be fully utilized. FIG. 11 is a memory system with multiple bits per pixel (e.g. a Grey scale). In order to control multiple bit planes it is only necessary to add two separate control lines from each scan line processor to each separate bit plane. The bulk of the control lines can still be shared between all of the memory segments in all bit planes.

Figure 12:
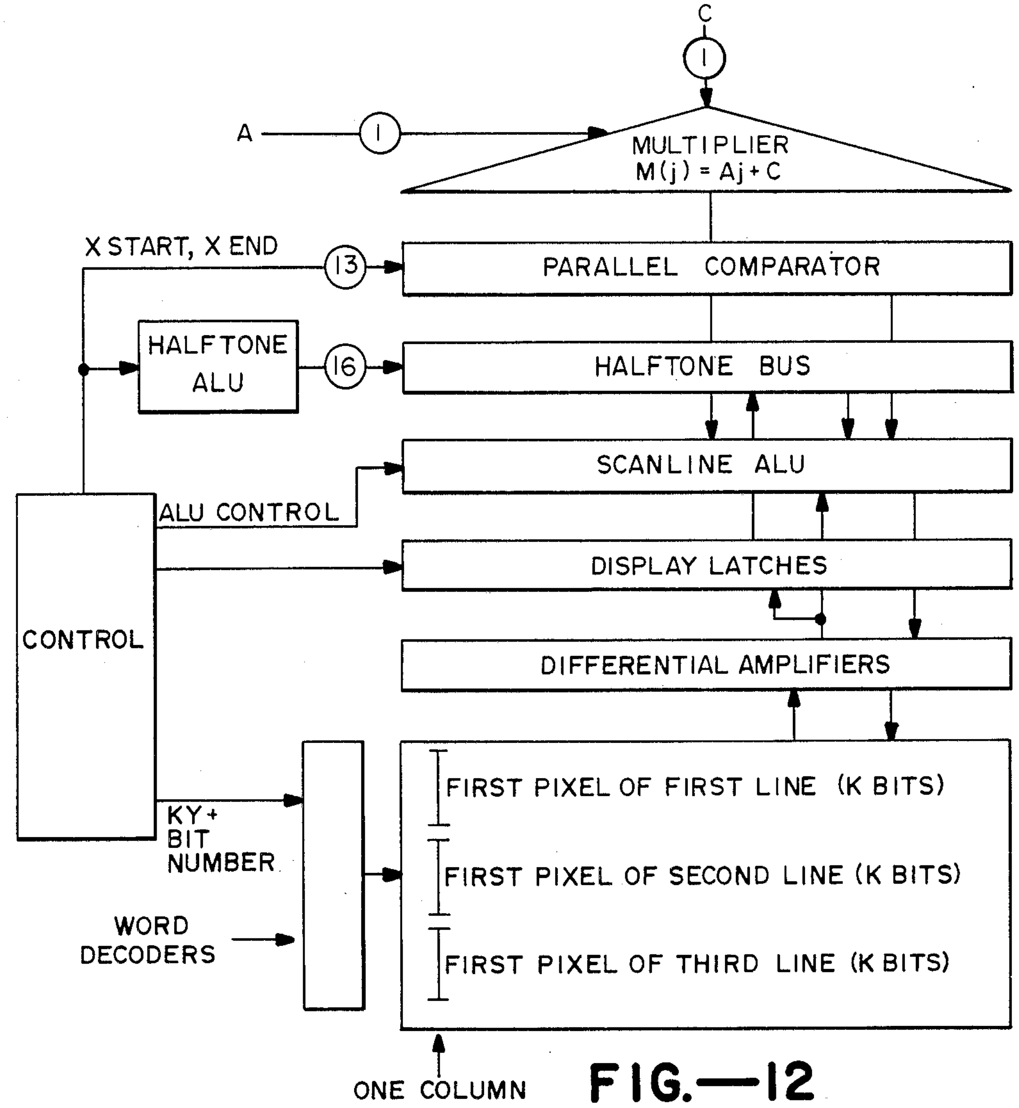
FIG. 12 is a functional block diagram of a memory segment which accommodates smooth shading.

At the expense of complicating the memory segment architecture somewhat, it is possible to add Gouraud smooth shading capability as shown in FIG. 12. Each pixel is stored as a K-bit intensity value "vertically" along a column of the memory array as shown. The proper X pixel subrange can be computed by the parallel comparator as before. But, because the pixels are stored vertically, at least K memory cycles are required to store intensities into the selected pixels.

Figure 13:
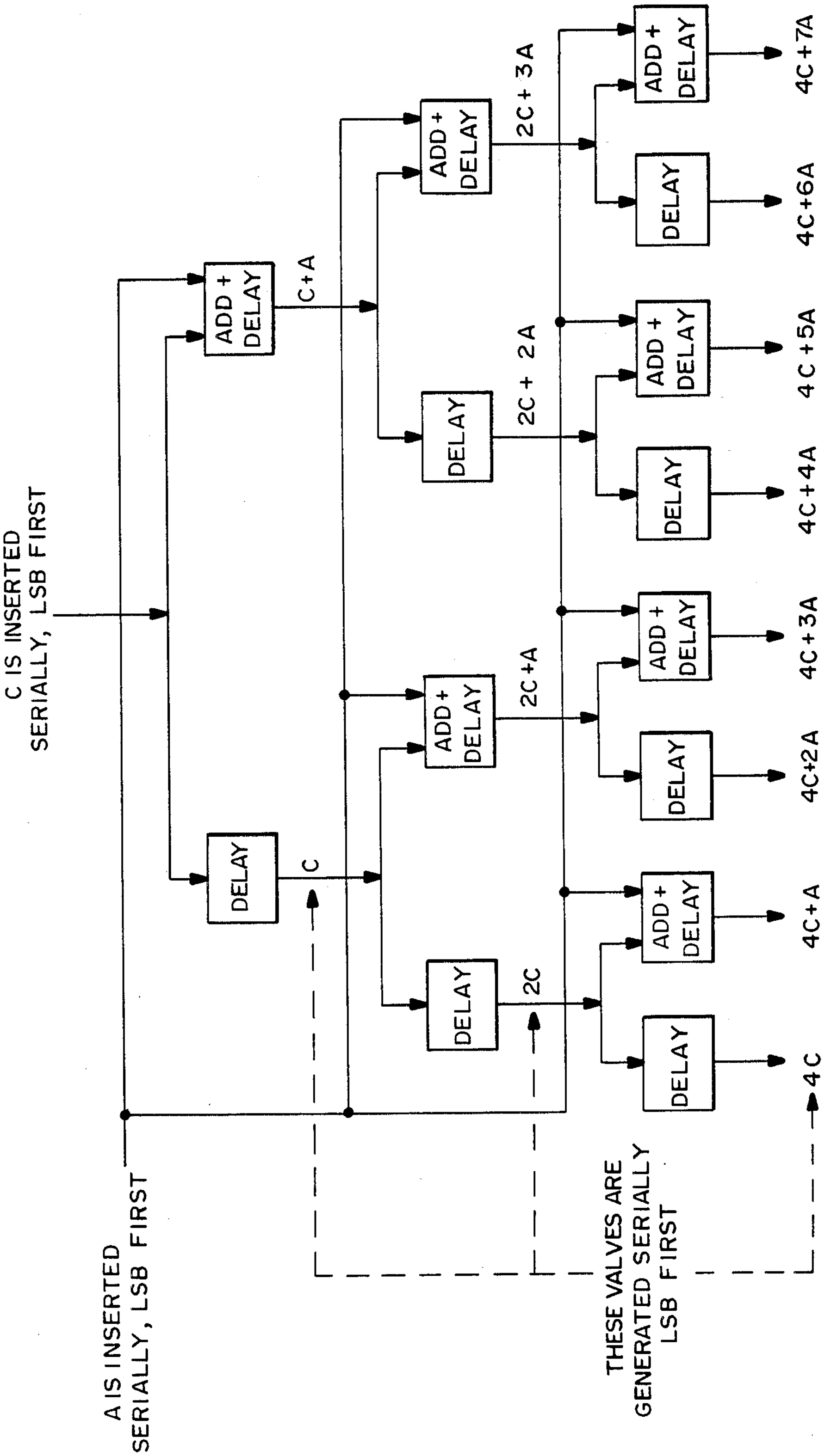
FIG. 13 is a multiplier tree useful in the memory segment of FIG. 12.

In order to smooth shade a polygon (known as Gourand shading in the art) it is necessary to place linearly interpolated intensity values at each pixel along a scan line. Fortunately, it is easy to generate a bit serial linear interpolation by using a binary tree similar to a serial multiplier as illustrated in FIG. 13. Each node of the tree is either a simple serial adder or a unit delay. As the coefficient A and the constant C are serially inserted into the tree (by the Scan Line Processor), each leaf node of the tree begins to generate one bit of the value Ax+constant, where x represents the physical position of the leaf in the tree as shown. If the intensities are to be accurate to within one intensity value, A must be represented as a fixed point number with a fractional part of size equal to the total number of bits required to represent the maximum X coordinate (called N) (e.g. if an 8 but intensity is desired for a 1024 pixel wide screen, A must have 8 integer and 10 fractional bits).

As a result, each scan line of a smooth shaded polygon requires N+K processor cycles, of which only the last K store bits into the selected pixels. However, in order to represent a full K bits per pixel, one must now make a system with K times more processors (than for a one bit per pixel system) to hold the extra bits. These can all operate in parallel so the effective decrease in performance (with respect to a one bit per pixel system) is only (N+K)/K, which is about 2 if N and K are approximately equal. Thus, it only takes twice as long to fill a smooth shaded polygon as it does to fill a constant intensity polygon.

Figure 14:
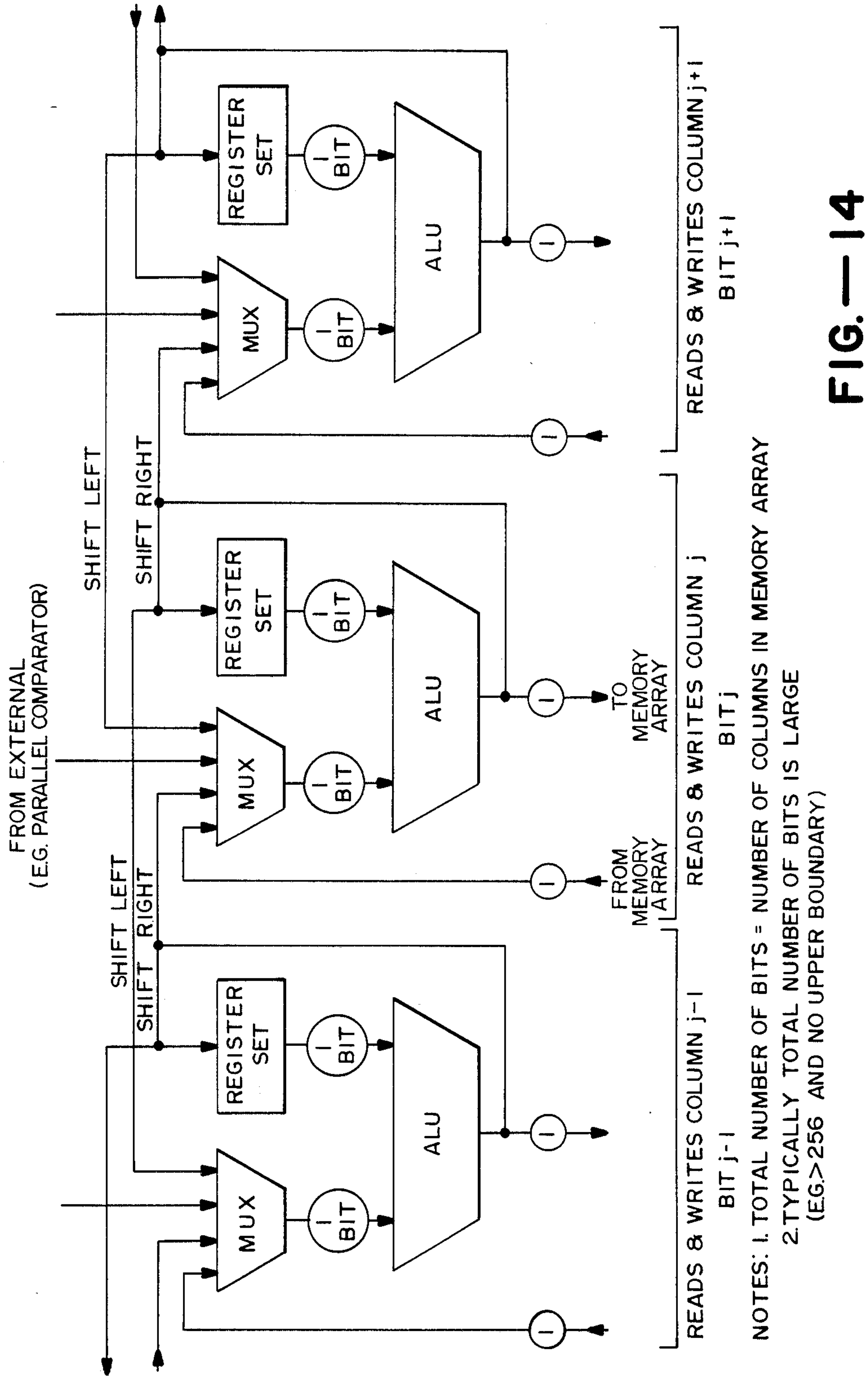
FIG. 14 is a generalized ALU and associated circuitry in accordance with the invention.

Up until now, there has been described a special purpose system which is streamlined for the specific purpose of high speed rasterization. However, a slight generalization of the ALU and associated circuitry (the data path) at the top edge of the memory array, as shown in FIG. 14, yields a general purpose highly parallel general processor data path capable of being programmed to perform many tasks. Input and output from the array can be performed by the use of a shift register or by other external means. Due to its general purpose nature, it is not possible to describe all of the specific uses to which such an architecture might be put. Clearly, one of the uses is to perform rasterization, but any task which can make use of this architecture can be performed.

As can be seen, the structure of the processor is similar to that of a conventional computer data path. The innovation lies in the fact that (i) the processor is associated with a large, 2 dimensional memory array, which can be accessed one row at a time, and (ii) the number of bits in the data path "word" is much larger than those used in the art (256 or more versus 16 or 32), (iii) due to this wide "word" the processor and memory are physically placed next to each other on one integrated circuit.

This architecture would be impractical if it were not for the initimate closeness of the processor data path and the memory on which it operates because of the impracticality of connecting 256 (or more) bit words between the memory and the computing units when they are physically separated.

There has been described a high speed memory system which is particularly advantageous for controlling a raster image. By utilizing a plurality of memory segments each having its own processor, parallel operation is provided in which rapid data update and manipulation is facilitated. The memory segments readily lend themselves to very large scale integration (VLSI) microcircuit manufacturing techniques.

While the invention has been described with reference to specific embodiments, the description is illustrative of the invention and is not to be construed as limiting the invention. For example, a conventional stored program computer based on the AMD 2901, for example, can be used as the scan line processor. This processor can be programmed using graphic algorithms known in the art to generate the required commands to the memory segments. Thus, various modifications and applications may occur to those skilled in the art without departing from the true spirit and scope of the invention as defined by the appended claims.

What is claimed is:

1. A high speed memory system for creating a raster of pixel elements comprising an image which is displayed in response to pixel data as the image is scanned along a plurality of scan lines, said memory system comprising a bus for providing transformed data of graphical primitives in display coordinates, a plurality of scan line processors connected to receive said transformed data from said bus, each scan line processor controlling data for a plurality of scan lines, and a plurality of data memory means for storing data for all of said scan lines, each of said data memory means connected to receive data from one of said scan line processors, each of said data memory means comprising a plurality of memory segments with each memory segment storing data for a limited portion of each of said plurality of scan lines controlled by the scan line processor to which said data memory means is connected, thereby providing parallel storage, access, and operation on stored data.

2. The memory system as defined by claim 1 wherein each memory segment includes a random access storage array representing a portion of a raster image and a processor which responds to scan line number, start point, and end point data from said scan line processor for modifying selected data in said random access storage array.

3. The memory system as defined by claim 2 wherein said processor is further responsive to halftone pattern data from said scan line processor for storing and accessing data in said random access storage array.

4. The memory system as defind by claim 2 wherein said processor is further responsive to commands from said scan line processor for performing Boolean logical operations on selected portions of stored image raster data.

5. The memory system as defined by claim 2 wherein said processor responds to commands including the row of said memory array, the first and last element of a contiguous subset which an arithmetic logic unit is to modify, the pattern of binary digits for the halftone pattern, and the Boolean logical operation which the arithmetic logic unit is to perform.

6. The memory system as defined by claim 5 wherein each memory segment includes display latch means for receiving data from said random access storage means for use in extracting the image from said memory segment.

7. The memory system as defined by claim 2 wherein each memory segment includes display latch means for receiving data from said random access storage means for use in extracting the image from said memory segment.

8. The memory system as defined by claim 1 wherein said data memory means stores pixel data as intensity values.

9. The memory system as defined by clalim 8 wherein said data memory means includes a plurality (K) of storage locations for each (K bit) pixel intensity value, said plurality of storage locations being arranged whereby one bit of all pixels on a scan line are accessible simultaneously.

10. The memory system as defined by claim 9 wherein each row of said memory array contains one of the K intensity bits of a row of pixels.

11. The memory system as defined by claim 10 and further including a binary tree for providing interpolated pixel intensity values.

12. The memory system as defined by claim 11 wherein said interpolated values are calculated simultaneously for all selected pixels on a scan line, said values being provided for all selected pixels one bit at a time.

13. The memory system as defined by claim 9 and further including a binary tree for providing interpolated pixel intensity values.

14. A method of processing data for generating a multiline raster image comprising the steps of storing pixel data for a plurality of scan lines in locations in a plurality of memory segments which can be accessed in parallel, and simultaneously accessing, processing, and modifying a plurality of pixel data locations for any one scan line, said data being processed in run length commands including scan line containing the pixels to be modified (Y), first point to be modified (Xs), and last point to be modified (Xe).

15. The method as defined by claim 14 and including the step of latching pixel data from said plurality of memory segments for display scan line control which allows manipulation of data stored in said memory segments while said latched data is independently extracted from said memory segment.

16. The method as defined by claim 15 and including the step of processing in parallel data for pluralities of scan lines.

17. A method of processing data for generating a multiline raster image comprising the steps of storing pixel data for a plurality of scan lines in locations in a plurality of memory segments which can be accessed in parallel, and simultaneously accessing, processing, and modifying a plurality of pixel data locations for any one scan line, said graphical primitives being translated to horizontal line fill commands communicated to said plurality of memory segments.

18. The method as defined by claim 17 and including the step of matching pixel data from said plurality of memory segments for display scan line control which allows manipulation of data stored in said memory segments while said latched data is independently extracted from said memory segment.

19. The method as defined by claim 18 and including the step of processing in parallel data for pluralities of scan lines.

20. A memory segment for use in a high speed memory having a parallel architecture comprising random access storage array of storage elements arranged in rows and columns, a dedicated arithmetic logic unit responsive to control signals for storing, accessing, and operating on data in said storage array, and control means for directing said arithmetic logic unit (ALU) for accessing, operating on and storing any portion of data in a row wherein any storage elements in one row can be accessed and operated on simultaneously in one operation.

21. The memory segment as defined by claim 20 wherein said segment comprises a semiconductor integrated circuit.

22. The memory segment as defined by claim 20 wherein said control and ALU means respond to commands to operate on subsets of a memory row without changing unselected portions, said subset being variable from one operation to the next.

23. The memory segment as defined by claim 22 and executing commands consisting of the elements (i) the row of said memory array on which the said ALU is to operate, and (ii) the first and last element of said portion of accessed data which the said ALU is to modify.

24. The memory segment as defined by claim 20 wherein said arithmetic logic unit is further responsive to halftone pattern data for accessing, operating on, and storing data in said random access storage array.

25. The memory segment as defined by claim 24 wherein said arithmetic logic unit (ALU) is further responsive to commands for modifying stored data by performing Boolean logical operations on specified portions of the accessed data and the halftone pattern.

26. The memory segment as defined by claim 25 and further including latch means for receiving data from said random access storage means thereby allowing continued manipulation of data stored in said memory array while said latched data is independently extracted from said memory segment.

27. The memory segment as defined by claim 25 and executing commands consisting of four elements: (i) the row of said memory array on which the said ALU is to operate, (ii) the first and last element of said portion of accessed data which the said ALU is to modify, (iii) the pattern of binary digits of said halftone pattern, (iv) the Boolean logical operation which the ALU is to perform.

28. The memory segment as defined in claim 27 wherein said control means includes means to store a number of said patterns and to present one of them to said ALU each time one of the run lengths commands is presented to the said memory segment.

29. The memory segment as defined by claim 27 wherein said control and ALU means respond to commands to operate on subsets of a memory row without changing unselected portions, said subset being variable from one operation to the next.

30. The memory segment as defined by claim 25 wherein said pattern can be modified through the use of known logical Boolean operations before being used by said ALU to operate on said portion of accessed data.

31. The memory segment as defined by claim 20 wherein said data memory means stores pixel data as intensity values.

32. The memory segment as defined by claim 20 wherein said data memory means includes a plurality (K) of storage locations for each (K bit) pixel intensity value, said plurality of storage locations being arranged whereby one bit of all pixels on a scan line are accessible simultaneously.

33. The memory segment as defined by claim 32 wherein each row of said memory array contains one of the K intensity bits of a row of pixels.

34. The memory segment as defined by claim 33 and further including a binary tree for providing interpolated pixel intensity values.

35. The memory segment as defined by claim 34 wherein said interpolated values are calculated simultaneously for all selected pixels on a scan line, said values being provided for all selected pixels one bit at a time.

36. The memory segment as defined by claim 32 and further including a binary tree for providing interpolated pixel intensity values.

37. The memory segment as defined by claim 32 wherein said control and ALU means respond to commands to operate on subsets of a memory row without changing unselected portions, said subset being variable from one operation to the next.

38. A high speed memory system for creating a raster of pixel elements comprising an image which is displayed in response to pixel data as the image is scanned along a plurality of scan lined, said memory system comprising a bus for providing transformed data of graphical primitives in display coordinates, at least one scan line processor connected to receive said transformed data from said bus, said scan line processor controlling data for a plurality of scan lines, and a plurality of data memory means for storing data for all of said scan lines, each of said data memory means connected to receive data from said scan line processor, each of said data memory means comprising a plurality of memory segments with each memory segment storing data for a limited portion of each of said plurality of scan lines controlled by said scan line processor to which said data memory means if connected, thereby providing parallel storage, access, and operation on stored data, each memory segment including a random access storage array representing a portion of a raster image and a processor which responds to scan line number, start point, and end point data from said scan line processor for modifying selected data in said random access storage array.

* * * * *

UNITED STATES PATENT AND TRADEMARK OFFICE
CERTIFICATE OF CORRECTION

PATENT NO. : 4,648,045
DATED : March 3, 1987
INVENTOR(S) : Stefan Demetrescu

It is certified that error appears in the above-indentified patent and that said Letters Patent is hereby corrected as shown below:

Column 1, after the title, insert the following paragraph:

--This invention was made with Government support under DARPA Contract No. MDA903-79-0680 and NAVY Contract No. N00039-83-K-0431. The Government has certain rights in this invention.--

Signed and Sealed this

Thirteenth Day of December, 1994

Attest:

Bruce Lehman

BRUCE LEHMAN

*Attesting Officer*

*Commissioner of Patents and Trademarks*